United States Patent [19]

Daimon et al.

[11] Patent Number: 4,929,496
[45] Date of Patent: * May 29, 1990

[54] ELECTROCONDUCTIVE THERMOPLASTIC RESIN MOLDED PRODUCT

[75] Inventors: Takashi Daimon; Hideshi Sakamoto; Osamu Akimoto, all of Ichihara, Japan

[73] Assignee: Chisso Corporation, Japan

[*] Notice: The portion of the term of this patent subsequent to Jan. 2, 2007 has been disclaimed.

[21] Appl. No.: 291,958

[22] Filed: Dec. 30, 1988

[30] Foreign Application Priority Data

Jan. 5, 1988 [JP] Japan ............................ 63-543
Mar. 14, 1988 [JP] Japan ............................ 63-59795

[51] Int. Cl.$^5$ .................................................. B32B 7/00
[52] U.S. Cl. .................................. 428/246; 428/253; 428/284; 428/286; 428/408; 428/902
[58] Field of Search ............... 428/246, 253, 284, 286, 428/408, 902; 430/937, 942; 156/245

[56] References Cited

FOREIGN PATENT DOCUMENTS 58-155917 9/1983 Japan .
58-166035 10/1983 Japan .

Primary Examiner—James J. Bell
Attorney, Agent, or Firm—Leydig, Voit & Mayer

[57] ABSTRACT

An electroconductive thermoplastic resin molded product having neither fluffing of electroconductive fibers therein nor jutting phenomenon of electroconductive fibers at the corner parts thereof is provided, which product comprises (a) an electroconductive thermoplastic resin sheet including a thermoplastic resin film; (b) a non-woven fabric or a knitted or woven fabric consisting of hot-melt-adhesive fibers and electroconductive fibers irregularly entangled with each other and applied and integrally melt-adhered to one or both surfaces of said film and then subjected to surface treatment; and (c) a coating having a curing composition composed mainly of an unsaturated resin and a reactive diluent applied to the treated surface and crosslinked and cured and having a coating thickness of 1 to 15 μm; the electroconductive thermoplastic resin sheet being fixed between a pair of male and female molds at least one surface of which has a heat-resistant rubber thereat and molded.

12 Claims, 1 Drawing Sheet

ELECTROCONDUCTIVE THERMOPLASTIC RESIN MOLDED PRODUCT

BACKGROUND OF THE INVENTION

1. Field of the Invention

This invention relates to a thermoplastic resin molded product having electrical conductivity on the surface thereof.

2. Description of the Related Art

Processes for making thermoplastics electroconductive include a process of blending an antistatic agent with thermoplastics or applying the agent on the surface of the thermoplastic molded product and a process of blending carbon black as an electroconductive material with thermoplastics. However, in the case of the former process, the surface resistivity of the resulting product is at most about $10^9 \Omega/\square$ and yet there are drawbacks that the surface resistivity changes due to the ambient humidity; the antistatic effect is lost with lapse of time; etc. Further, in the case of the latter process, unless the more continuously the carbon black particles are present inside the thermoplastic resin sheet, the more the quantity thereof blended is increased, the aimed electrical conductivity cannot be obtained. However, if a large quantity of carbon black is blended, there are drawbacks that the mechanical strength of the molded product is notably reduced and the processability of the thermoplastic resin becomes inferior.

As electroconductive thermoplastic resin sheets solving the above-mentioned problems, an electroconductive thermoplastic resin sheet having a non-woven fabric consisting of electroconductive fibers and hot-melt-adhesive fibers (hereinafter referred to as electroconductive non-woven fabric) melt-adhered onto a thermoplastic resin sheet as a substrate is disclosed in Japanese patent application laid-open No. Sho 58-155917/1983, and an electroconductive thermoplastic resin sheet having a knitted or woven fabric consisting of electroconductive fibers and hot-melt-adhesive fibers melt-adhered onto and integrated with a thermoplastic resin sheet as a substrate is disclosed in Japanese patent application laid-open No. Sho 58-166035/1983.

These sheets are described therein to be subjected to heat forming such as vacuum forming, deep forming, etc. and used as molded products.

Usually, heat forming of thermoplastic resin sheets is in many cases carried out according to vacuum forming or pressure forming. According to these molding processes, a resin film in molten state is pressed onto a mold by air pressure to mold it. When the sheet disclosed in the above-mentioned Japanese Patent Application laid-open Nos. Sho 58-155917/1983 and Sho 58-166035/1983 is molded according to these processes, there is no particular problem if the surface of an electroconductive non-woven fabric or the surface of an electroconductive knitted or woven fabric is contacted with molds, but if the surface of the electroconductive non-woven fabric or that of the electroconductive knitted or woven fabric is not contacted with molds, electroconductive fibers protrude from the resin film to cause fluffing, and in addition, there is observed a phenomenon that electroconductive fibers are raised (or jut) from the resin film in the vicinity of the corner parts of the resulting molded products (this phenomenon hereinafter will be referred to as jutting phenomenon).

Further, press molding process is a process of molding by fitting a pair of male and female molds to each other, but in the case of this process, too, the more complicated the shape of the resulting molded products is, the more difficult it is to cause the clearance between the molds (i.e. a clearance formed when the male mold is fitted into the female mold in a state where no resin film is inserted thereinto) correspond to the thicknesses of the respective parts of the molded products; as a result, parts not contacted with the surfaces of the molds are necessarily formed. Thus, when an electroconductive thermoplastic resin sheet having an electroconductive non-woven fabric or an electroconductive knitted or woven fabric integrally melt-adhered onto both the surfaces thereof is subjected to press molding, then the electroconductive fibers in the electroconductive non-woven fabric or the electroconductive knitted or woven fabric inevitably cause partial fluffing or jutting phenomenon.

Furthermore, on the surface formed in contact with the molds is there sometimes appears to be no fluffing of the electroconductive fibers, but when the surface is rubbed by nails, cloth, etc., there is a problem that a portion of the electroconductive fibers peel off from the substrate to cause fluffing. The above-mentioned fluffing or jutting phenomenon not only deteriorates the appearance of the electroconductive molded products, but also when the surface is strongly rubbed, the electroconductive fibers fall off the surface of the molded products so that the environment is contaminated and further the electroconductive performance of the products is lowered; thus a serious obstacle to practical use of the products has been raised due to the above drawbacks.

When the surface of the electroconductive non-woven fabric or that of the electroconductive knitted or woven fabric is present on the surfaces of the molds, the electroconductive fibers are brought into a state where they are pressed onto the molds under the pressure exerted on the thermoplastic resin sheet and completely embedded inside the resin surface. Thus, no fluffing of the electroconductive fibers is observed.

Whereas, when the surface of the electroconductive non-woven fabric or that of the electroconductive knitted or woven fabric is not contacted with the surfaces of the molds, the thermoplastic resin sheet in a softened state is pressed onto the surfaces of the molds and the shape of the sheet is faithfully reproduced from those of the molds, but the electroconductive fibers in the electroconductive non-woven fabric or the electroconductive knitted or woven fabric cannot follow the deformation of the thermoplastic resin sheet and are hence protruded from the resin film. Since the deformation of the resin is particularly large in the vicinity of the corner parts of the molded products, the electroconductive fibers are completely separated from the resin to form a jutted state.

Further, even if no fluffing is observed when the thermoplastic resin sheet has been molded, fluffing often occurs when the surface of the resulting molded product is rubbed. This is presumed due to the fact that since the pressure under which the sheet is pressed onto the surfaces of the molds is so low that the electroconductive fibers have not been completely embedded in the resin film (namely the electroconductive fibers have not been completely coated by the resin layer or the layer is very thin and also liable to be peeled off).

The present inventors have made extensive research in order to overcome the above-mentioned problems raised when an electroconductive thermoplastic resin sheet obtained by having an electroconductive nonwoven fabric or an electroconductive knitted or woven fabric integrally melt-adhered onto at least one side surface of a thermoplastic resin film is subjected to vacuum, pressure or press forming. As a result, we have found that when a crosslinked and cured coating composed mainly of an unsaturated resin and a reactive diluent and having a coating thickness of 1 to 15 μm, preferably 1 to 10 μm is formed on the surface layer of the electroconductive thermoplastic resin sheet, followed by molding the resulting sheet in a pair of male and female molds at least one of which has a heat-resistant rubber on the surface layer thereof, then there is obtained a molded product which makes it possible to prevent fluffing and jutting phenomenon of the electroconductive fibers without lowering electrical conductivity and further even when strongly electroconductive fibers, and have achieved the present invention.

SUMMARY OF THE INVENTION

As apparent from the foregoing, the object of the present invention is to provide an electroconductive thermoplastic resin molded product having neither fluffing of the electroconductive fibers nor jutting phenomenon of electroconductive fibers at the corner parts of molded products.

The present invention has the following constitutions:

(1) an electroconductive thermoplastic resin molded product comprising (a) an electroconductive thermoplastic resin sheet comprising a thermoplastic resin film;

(b) a non-woven fabric consisting of hot-melt-adhesive fibers and electroconductive fibers irregularly entangled with each other and applied and integrally melt-adhered to one or both surfaces of said film and then subjected to surface treatment; and (c) a coating having a curing composition composed mainly of an unsaturated resin and a reactive diluent applied to the treated surface and crosslinked and cured and having a coating thickness of 1 to 10 μm, the electroconductive thermoplastic resin sheet being fixed between a pair of male and female molds at least one surface of which has a heat-resistant rubber and molded between the molds fitted to each other;

(2) an electroconductive thermoplastic resin molded product according to item (1) wherein the surface treatment is a corona discharge treatment;

(3) an electroconductive thermoplastic resin molded product according to item (1) wherein the curing of the curing composition is carried out by means of electron beams;

(4) an electroconductive thermoplastic resin molded product according to item (1) wherein said electroconductive fibers are carbon fibers, stainless steel fibers, carbon composite synthetic fibers, carbon-coated synthetic fibers or mixtures of at least two members of the foregoing;

(5) an electroconductive thermoplastic resin molded according to item (1) wherein the heat-product resistant rubber is silicone rubbers, acrylic rubbers or fluorinated rubbers;

(6) an electroconductive thermoplastic resin molded product according to item (1) wherein the curing composition is partly applied to the surface of the electroconductive resin sheet by means of a half tone screen, and the applied area ($A_P$) and the area of said electroconductive thermoplastic resin sheet ($A_T$) have a relationship of $0.3 \leq (A_P/A_T) \leq 0.9$;

(7) an electroconductive thermoplastic resin molded product comprising (a) an electroconductive thermoplastic resin sheet comprising a thermoplastic resin film;

(b) a knitted or woven fabric consisting of hot-melt-adhesive fibers and electroconductive fibers irregularly entangled with each other and applied and integrally melt-adhered to one or both surfaces of the film and then subjected to surface treatment; and (c) a coating having a curing composition composed mainly of an unsaturated resin and a reactive diluent applied onto the treated surface and crosslinked and cured and having a coating thickness of 1 to 15 μm, the electroconductive thermoplastic resin sheet being fixed between a pair of male and female molds at least one surface of which has a heat-resistant rubber and molded between the molds fitted to each other;

(8) an electroconductive thermoplastic resin molded product according to item (7) wherein the surface treatment is a corona discharge treatment;

(9) an electroconductive thermoplastic resin molded product according to item (7) wherein the curing of said curing composition is carried out by means of electron beams;

(10) an electroconductive thermoplastic resin molded product according to item (7) wherein the electroconductive fibers are carbon fibers, stainless steel fibers, carbon composite synthetic fibers, carbon-coated synthetic fibers or mixtures of at least two members of the foregoing;

(11) an electroconductive thermoplastic resin molded product according to item (7) wherein the heat-resistant rubber is silicone rubbers, acrylic rubbers or fluorinated rubbers; and

(12) an electroconductive thermoplastic resin molded product according to item (7) wherein the curing composition is partly applied to the surface of the electroconductive resin sheet by means of a half tone screen, and the applied area ($A_P$) and the area ($A_T$) of the electroconductive thermoplastic resin sheet have a relationship of $0.3 \leq (A_P/A_T) \leq 0.9$.

DETAILED DESCRIPTION OF PREFERRED EMBODIMENTS

Figures 1, 2:
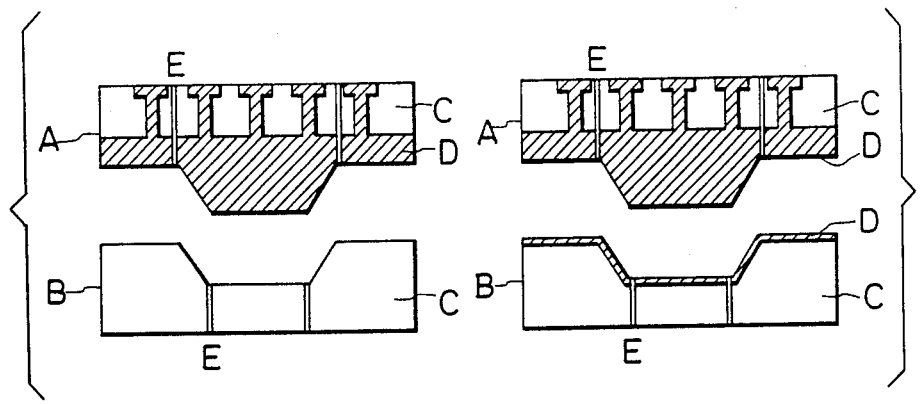
FIG. 1 shows a male mold and female mold consisting of a male mold (A) having a mold composed of a heat-resistant rubber applied on the surface of the body material (C) thereof and a female mold (B) consisting only of the body material (C).
FIG. 2 shows a male mold and female mold consisting of a male mold (A) having a mold composed of a heat-resistant rubber applied on the surface of the body material thereof (C) and a female mold (B) having a structure wherein a body material thereof (C) is templated and the resulting material is coated with a heat-resistant rubber.

Examples of the thermoplastic resin used for the thermoplastic resin film in the present invention are polyolefin resins such as polyethylene, polypropylene, ethylene-vinyl acetate copolymer, ethylene-ethyl acrylate copolymer, etc.; styrene resins such as polystyrene, acrylonitrile-butadiene-styrene copolymer, acrylonitrile-styrene copolymer, etc.; acrylic resins such as polymethyl methacrylate, etc.; polyamide resins such as 6-nylon, 66-nylon, 12-nylon, 6.12-nylon, etc.; polyester resins such as polyethylene terephthalate, polybutylene terephthalate, etc.; polyvinyl chloride, polycarbonates, polyphenylene oxides and mixtures of the foregoing.

With these resins may be blended various additives such as heat stabilizer, weathering stabilizer, plasticizer, lubricant, slip agent, antistatic agent, charge-transfer type polymer, nucleating agent, fire retardant, tackifier (petroleum resin, etc.), pigment, dye, inorganic filler, organic filler, etc. depending on the object.

Further, examples of hot-melt-adhesive fibers used for electroconductive non-woven fabrics and electroconductive knitted or woven fabrics are acrylic fibers, polyamide fibers, polyester fibers, polyolefin fibers, polyvinyl chloride fibers and mixtures of the foregoing, and these fibers have no particular limitation as far as they can be melt-adhered to the thermoplastic resin film as substrate. If necessary, with these fibers may be blended a fire-retardant, coloring agent, antistatic agent, charge-transfer type polymer, etc.

As to the hot-melt-adhesive fibers, those having a fiber diameter of about 0.5 to 10 d are preferably used. Further, as to the hot-melt-adhesive fibers constituting the non-woven fabric, those having a fiber length of about 5 to 100 mm are preferred.

Next, examples of the electroconductive fibers are composite synthetic fibers with metals or metal compounds, synthetic fibers coated by metals or metal compounds, glass fibers coated by metals or metal compounds, carbon fibers coated by metals or metal compounds, composite synthetic fibers with carbon, synthetic fibers coated by carbon, carbon fibers, metal fibers, etc. and mixtures of the foregoing. Further, in the present invention, in order to fortify adhesion of the crosslinked and cured coating onto the surface of the electroconductive thermoplastic resin sheet, it is necessary to subject the surface of the electroconductive thermoplastic resin sheet to surface treatment to thereby enhance the wetting tension of the surface. As the surface treatment process, corona discharge treatment is generally employed, but when the corona discharge treatment is carried out in the atmosphere, some electroconductive fibers lose their electrical conductivity in the oxidation reaction by way of coronadischarge; hence caution against this is needed. In addition, corona discharge treatment in an inert gas atmopshere is also possible, but such a treatment is not practical since a number of problems arise in the aspects of operational safety, furnishments, etc.

When the corona discharge treatment is carried out in the atmosphere, it is preferred to use electroconductive fibers causing no reduction in the electrical conductivity such as carbon fibers, stainless steel fibers, composite synthetic fibers with carbon, synthetic fibers coated by carbon or mixtures of at least two members of the foregoing.

As to the electroconductive fibers, those having a fiber diameter of about 1 to 30 μm are preferably used and as to the electroconductive fibers constituting the non-woven fabric, those having a fiber length of about 5 to 100 mm are preferred.

Further, besides the above-mentioned hot-melt-adhesive fibers and electroconductive fibers, fibers having high melting points or fibers exhibiting no melting properties may be blended with the electroconductive non-woven fabric or electroconductive knitted or woven fabric of the present invention.

The electroconductive non-woven fabric may be prepared from the above-mentioned hot-melt-adhesive fibers and electroconductive fibers according to known processes such as binder process, needle-punching process, a process of water-pressure entangling by way of spun bonding, heat adhesion process, wet making process, etc., and those fabrics having a basis weight of 100 g/m$^2$ or less are preferably used.

The proportion of the electroconductive fibers used for preparing the electroconductive non-woven fabric or electroconductive knitted or woven fabric of the present invention is 1 to 99% by weight, preferably 3 to 70% by weight, more preferably 10 to 60% by weight based upon the weight of the electroconductive nonwoven fabric or the electroconductive knitted or woven fabric.

If the proportion of the electroconductive fibers exceeds 99% by weight, preparation of the electroconductive non-woven fabric is not only difficult, but also adhesion thereof onto the thermoplastic resin film is insufficient, while if it is less than 1% by weight, it is impossible to impart a good electrical conductivity Further, the electroconductive knitted or woven fabric of the present invention may be prepared according to known processes such as a process of mix-spinning cut fibers of the above-mentioned hot-melt-adhesive fibers and electroconductive fibers to prepare spun yarns and weaving the spun yarns which are used for at least one of warp yarns or weft yarns to obtain a woven fabric, a process of weaving filament yarns of the hot-melt-adhesive fibers and filament yarns of the electroconductive fibers to obtain a woven fabric, a process of weaving yarns obtained by twisting the hot-melt-adhesive fibers and the electroconductive fibers together to obtain a woven fabric, a process of knitting spun yarns, filament yarns or twisted yarns as described above to obtain a knitted fabric or lace, etc., and those having a basis weight of 200 g/m$^2$ or less are preferred.

Examples of the unsaturated resin constituting the main component of the curing composition are epoxy resins, polyester resins, polyurethane resins, polyamide resins, melamine resins, etc. and among these resins, those obtained by introducing an acryloyl group into a polymer at the end or side chain thereof the backbone chain of which polymer is selected from polyesters, epoxies, polyurethanes, polyethers, polyols, etc. having a high radiation-activity, such as polyester acrylates, polyepoxy acrylates, polyurethane acrylates, polyether acrylates, polyol acrylates, etc. are preferably used. These resins are used usually in the form of oligomers having a molecular weight of about 250 to 1,500 and the number of acryloyl groups per molecule is 2 to 5.

Further, examples of the reactive diluent are polyfunctional monomers such as trimethylolpropane triacrylate, pentaerythritol triacrylate, pentaerythritol tetraacrylate, ethylene glycol diacrylate, tetraethylene glycol diacrylate, polyethylene glycol diacrylate, 1,6- hexanediol diacrylate, neopentyl glycol diacrylate, triacryloxyethyl phosphate, etc., monofunctional monomers such as vinyl pyrrolidone, 2-hydroxyethyl (meth)acrylates, 2-hydroxypropyl (meth)acrylates, tetrahydrofurfuryl acrylate, butoxyethyl acrylate, ethyl diethylene glycol acrylate, 2-ethylhexyl acrylate, cyclohexyl acrylate, phenoxyethyl acrylate, 2-hydro-3-phenyloxypropyl acrylate, dicyclopentadiene acrylate, etc., and mixtures of at least two members of the foregoing.

To the curing composition may be added various kinds of additives, if necessary. Examples of these additives are various natural or synthetic high-molecular substances, fillers, pigments, dyes, delustrants, plasticizers, viscosity modifiers, solvents, and other auxiliaries, etc.

Examples of the above-mentioned high-molecular substance are various polymers, copolymers, prepolymers, oligomers containing saturated or unsaturated groups and belonging to (meth)acrylic compound, urethane, butadiene, ethylene, vinyl chloride, vinylidene chloride, polyether, alkyd, polyester, polyamide, vinyl acetate, vinyl formal, vinyl butyral, vinylpyrrolidone, vinyl alcohol, etc., cellulose, its derivatives, rosin, its derivatives, phenol resins, their derivatives, petroleum resins, silicone resins, natural or synthetic oils and fats, waxes, etc.

Examples of the filler are fibers or powder of glass, metals or metal compounds, silica, barytes, calcium carbonate, etc.

Examples of the pigment are extender pigments such as alumina white, clay, talc, barium carbonate, barium sulfate, etc., inorganic pigments such as zinc white, lead white, yellow lead oxide, ultramarine blue, Prussian blue, titanium oxide, zinc chromate, red oxide, carbon black, etc., and organic pigments such as Brilliant Carmine 6B, Permanent Red R, Benzidine Yellow, Lake Red C, Phthalocyanine Blue, etc.

Examples of the dye are basic dyes such as magenta, rhodamine, etc., direct dyes such as Direct Scarlet, Direct Orange, etc., and acid dyes such as Roccelline, Metanyl Yellow, etc.

Examples of the delustrant are organic delustrants such as polyacrylonitrile powder, etc. and inorganic delustrants such as powdery silica or its modified substances, etc.

Examples of the plasticizer are dibutyl phthalate, dioctyl phthalate, chlorinated paraffin, tricresyl phosphate, etc.

Examples of the viscosity modifier are bentonite, silica gel, aluminum octoate, etc.

Examples of the solvent are various solvents belonging to ketones, alcohols, esters, ethers, aliphatic, alicyclic or aromatic hydrocarbons, etc.

Examples of the other auxiliaries are known defoamers, leveling agents, surfactants, UV absorbers, fire retardants, charge-transfer type polymers, etc.

In the case where the curing means utilizes mainly heat energy such as those generated by heat oven, infrared rays irradiation, microwave irradiation, etc., radical initiators such as ketone peroxides, hydroperoxides, dialkyl peroxides, diacyl peroxides, etc. may be used. In the case where curing is carried out at relatively low temperatures as in the case of normal temperature curing, it is preferred to use promotors together with the radical initiators, for example, to use a combination of ketone peroxides or diacyl peroxides with metal salts, a combination of ketone peroxides, diacyl peroxides or hydroperoxides with reducing amines. Further, in the case where the curing means is ultraviolet-ray irradiation, light initiators, as for example benzoin compounds such as benzoin, benzoin methyl ether, benzoin ethyl ether, benzoin propyl ether, benzoin butyl ether, benzoin octyl ether, etc., carbonyl compounds such as benzil, diacetyl, methylanthraquinone, acetophenone, benzophenone, etc., sulfur compounds such as diphenyl disulfide, dithiocarbamate, etc., naphthalene compounds such as $\alpha$-chloromethylnaphthalene, etc., anthracene, metal salts such as iron chloride, etc. are used.

The electroconductive thermoplastic resin sheet of the present invention may be obtained e.g. according to the following process:

an electroconductive non-woven fabric or an electroconductive knitted or woven fabric is laminated onto a thermoplastic resin film as a substrate according to a known process such as an extrusion-lamination process, heated roll contact-bonding process, heat press, etc. to integrate them by melt-adhesion. At that time it is necessary to choose a temperature condition under which the hot-melt-adhesive fibers constituting the electroconductive non-woven fabric or those blended with the electroconductive knitted or woven fabric are completely melted and integrated with the thermoplastic resin film as a substrate.

For example, in the case of an extrusion-lamination process, a thermoplastic resin as the substrate is first melt-kneaded at a resin temperature of 180° to 280° C. in an extruder and extruded through a T-die in the form of a film, followed by overlaying an electroconductive non-woven fabric or knitted or woven fabric on one side surface or both the surfaces of the film and contact-bonding them by means of a pair of rolls heated to about 30° to 120° C., to integrate the substrate with the electroconductive non-woven fabric or knitted or woven fabric by melt-adhesion. At that time, in order to ease the integration of the electroconductive non-woven fabric or knitted or woven fabric with the substrate, a heat-resistant plastic film having a thickness of preferably about 10 to 50 $\mu$m such as biaxially stretched polyester film, teflon film, etc. may be further overlaid in contact with the electroconductive non-woven fabric or knitted or woven fabric, followed by melt-adhering them under pressure in such an overlaid state as it is, cooling and solidifying them and peeling off the heat-resistant plastic film to obtain the electroconductive thermoplastic resin sheet.

Further, in the case of heated roll contact-bonding process, a thermoplastic resin sheet is overlaid on an electroconductive non-woven fabric or knitted or woven fabric, followed by integrating them under pressure by means of heated rolls heated to 100° to 200° C.

The thickness of the electroconductive thermoplastic resin sheet may be optionally chosen within a range of 0.03 to 5.0 mm.

Next, in order to enhance its adhesion onto the curing composition, the surface of the electroconductive non-woven fabric or knitted or woven fabric on which the electroconductive thermoplastic resin sheet obtained according to the above-mentioned process is overlaid, is subjected to surface treatment. As the surface treatment, various known processes may be employed such as chemical treatment, coupling treatment, primer treatment (polymer coating), surface grafting, ultraviolet-ray irradiation treatment, plasma treatment (such as corona discharge treatment, glow discharge treatment, plasma jet treatment, etc.), plasma polymerization treatment, etc. Among these processes, it is most preferred to employ a corona discharge treatment according to which continuous production is possible and which is superior in general-purpose properties. In the case of the present invention, as the equipment for the corona discharge treatment, it is preferred to employ equipment for treating electroconductors (since if a corona discharge treating equipment for insulant is employed, sparking or scorching occurs). Further, it is preferred to carry out the corona discharge treatment just after preparation of the above-mentioned electroconductive thermoplastic resin sheet.

The surface wetting tension of the surface-treated surface (measured according to ASTM-D-2578, Test for Wetting Tension of PE and PP Film) is preferred to adjust so as to give 35 dynes/cm or more, preferably 38 dynes/cm or more.

Thereafter, the above-mentioned curing composition is further applied to the surface-treated surface, followed by irradiating with heat energy, ultraviolet-rays, ionizing radiation or the like to form a crosslinked and cured coating having a coating thickness of 1 to 15 μm on the surface of the composition.

Examples of a coating means for the curing composition are blade coater, knife coater, roll coater (three-roll coater, direct coater, reverse roll coater, etc.) and besides, coaters of various print types such as screen, offset, gravure, letter press, flexographic printing, etc. In some case, a spray type coater may be employed.

The quantity of the curing composition applied to the surface of the electroconductive thermoplastic resin sheet is, preferably an amount suitable to adjust the coating thickness of the crosslinked and cured coating formed on the surface of the sheet, to a range of 1 to 15 μm, preferably 1–10 μm, more preferably 2 to 7 μm. If the coating thickness of the cured coating is less than 1 μm, it is impossible to completely prevent the fluffing of the electroconductive fibers from occurring, while if it exceeds 15 μm, the surface resistivity is higher than $10^{12} \Omega$ so that the electroconductivity becomes inferior.

The curing composition may be applied onto the whole surface of the thermoplastic resin sheet (solid application), but the resulting coating cracks due to the deformation at the time of heat forming to deteriorate the appearance; hence partial application using various shapes of half tone screens is preferred. In this case, the relationship between the applied area of the curing composition ($A_P$) and the area of the electroconductive thermoplastic sheet ($A_T$) is preferred to satisfy the following expression:

$$0.3 \leq (A_P/A_T) \leq 0.9.$$

If $(A_P/A_T) > 0.3$, fluffing often occurs at the part where no application is carried out, while if $(A_P/A_T) < 0.9$, the resulting coating cracks due to the deformation at the time of heat forming to notably damage the appearance.

As a curing means for the curing composition, normal temperature curing, means utilizing mainly heat energy such as a heating oven, infrared ray irradiation, microwave irradiation, etc., ultraviolet ray irradiation, irradiation by means of ionizing radiation such as electron beams, γ-rays, etc. are exemplified, but among these, electron beam irradiation is preferred in the aspects of productivity (curing time), slight deterioration of the thermoplastic resin film as a substrate due to heating, etc.

The electron beam irradiation is carried out by means of an electron beam accelerator according to a scanning beam process or curtain beam process in $N_2$ gas atmosphere ($O_2$ concentration: 400 ppm or less).

The curing conditions of the coating are as follows: electron beam voltage, 125 to 300 KV and amount of radiation, about 1 to 20 M rad.

The above-mentioned electroconductive sheet is heated to the softening point of the thermoplastic resin according to various known heating methods, followed by inserting the sheet between a pair of male and female molds as shown in FIGS. 1 to 4, fixing it, fitting both the molds to each other under a pressing pressure of 0.1 to 20 kg/cm²G and at a mold temperature of about 10° to 100° C. and molding the sheet. At that time, the material on the surface layer of the molds is preferred to be rubbers having heat resistance to such an extent that they are not deformed, degenerated or deteriorated by the heat of the electroconductive thermoplastic resin sheet, such as silicone rubbers, acrylic rubbers, fluororubbers, etc. Further, as the body material of the molds, there are used stocks having a strength sufficiently endurable to the pressing pressure, such as woods, gypsum, resins (thermoset resins), castings, metals, etc. Further, the clearance (CL) between male and female mold (i.e. a clearance formed when male and female molds are fitted to each other in a state where the electroconductive sheet is not yet inserted) varies depending on the draw ratio of the molds (i.e. a value obtained by dividing the depth of a molded product by the diameter or short side of the molded product), but if the intended thickness of the molded product is referred to as T, the clearance is preferred to fall within the range of $T \geq CL > 0$ mm.

The present invention will be described in more detail by way of examples and comparative examples, but it should not be construed to be limited thereto In addition, the measurement methods employed in examples and comparative examples are as follows:

(1) melt flow rate according to ASTM D-1238 (temperature 230° C. and load 2.16 Kg);

(2) high melt flow rate according to ASTM D-1238 (temperature 230° C. and load 10.2 Kg);

(3) isotactic pentad ratio measured based on Macromolecules, 8, 687 (1975), the ratio being an isotactic ratio in terms of pentad units in polypropylene molecular chain, using $^{13}C$-NMR; and (4) surface resistivity ($\Omega$)

A. computing digital multimeter, TR 6877 manufactured by Takeda Riken Co., Ltd. and B. high resistor, STACK $T_n$-3 manufactured by TOKYO ELECTRIC Co., Ltd. As electrodes, rod-form electrodes (5 mmφ) were used. Distance between the electrodes: 3–5 μm.

Only in the case of $10^{-7} \Omega$ or more, B was employed for the measurement.

EXAMPLE 1

An electroconductive non-woven fabric having a basis weight of 15 g/m² was obtained from 80% by weight of low melting polypropylene fibers (m.p. 128° C.) having a fiber diameter of 2 d and a fiber length of 51 mm and 20% by weight of carbon-coated polyester fibers having a fiber diameter of 3 d and a fiber length of 51 mm according to heat-melt adhesion process.

Next, polypropylene pellets obtained from a blend of a highly crystalline propylene homopolymer having an isotactic pentad ratio (P) of 0.968, a melt flow rate (MFR) of 0.53 g/10 min and a high melt flow rate (HMFR) of 23.5 g/10 min, with 0.10% by weight of 1,3,5-trimethyl-2,4,6-tris(3,5-di-t-butyl-4-hydroxybenzyl)benzene, 0.10% by weight of tetrakis[methylene(3,5-di-t-butyl-4-hydroxy-hydrocinnamate)]methane and 0.05% by weight of calcium stearate were melt-kneaded by means of an extruder having a bore diameter of 65 mm and extruded through a T-die of 600 mm wide in the form of film at a resin temperature of 240° C.

On both the surfaces of the resulting film were overlaid the above-mentioned electroconductive non-woven fabric (two sheets in total), followed by integrally contact-bonding the substrate with the electroconductive non-woven fabrics by means of a pair of a touch roll (metal roll) of 200 mm in diameter into which hot water at 80° C. was passed and a chill roll (metal roll) of 500 mm in diameter to obtain an electroconductive polypropylene sheet of 0.8 mm thick. In addition, at this step, a biaxially stretched polyester film of 12 μm thick was inserted onto the surface of the electroconductive non-woven fabric on the side of the touch roll, followed by cooling the resulting electroconductive polypropylene sheet and then peeling off the polyester film. The electroconductive polypropylene sheet at that time had a surface resistivity of $10^5 \Omega$ on both the surfaces thereof.

Next, both the surfaces of the electroconductive polypropylene sheet were subjected to corona discharge treatment by means of a corona discharge treatment equipment for electroconductors in the atmosphere. Both the surfaces thereof had a wetting tension of 41 dyne/cm. Further, the surface resistivity of the electroconductive polypropylene sheet after the corona discharge treatment was $10^5 \Omega$ on both the surfaces, that is, entirely unchanged from the value before the corona discharge treatment.

Further, as the curing composition, there was prepared a mixture composition consisting of 42% by weight of a polyepoxy acrylate oligomer, 55% by weight of 2-hydroxypropyl acrylate, 2% by weight of a betaine surfactant and 1% by weight of a polymerization inhibitor.

The above composition was applied onto the whole surface (one side surface) of the above electroconductive polypropylene sheet by means of a gravure roll ($A_P/A_T=0.6$), followed by irradiating electron beams onto the resulting material by means of an electron curtain conveyor type electron beam irradiation equipment (ELECTRON EPZ-2 Type (trademark of product manufactured by ESI Co., Ltd.), in $N_2$ atmosphere ($O_2$ concentration: 200 ppm) at an accelerated voltage of 140 KV and in an amount of radiation of 6 Mrad to form a crosslinked and cured coating of 5 μm thickness. Similarly, a crosslinked and cured coating of 5 μm thickness was formed on the other surface.

Next, the electroconductive polypropylene sheet having the crosslinked and cured coating formed thereon was inserted between a pair of male and female molds (body material used: metal and mold temperature: 50° C.) as shown in FIG. 1, followed by fixing the sheet and fitting both the molds to each other under a pressure of 7 kg/cm²G to obtain an electroconductive molded product. At that time, a silicone rubber (hardness=40) was used on the surface layer of the male mold. The clearance (CL) between the male and female molds was made 0.5 to 0.7 mm.

No fluffing and no jutting phenomenon of the electroconductive fibers were observed on either or the surfaces of the resulting electroconductive molded product, and yet even when the surfaces were strongly rubbed by cloth, nails, etc., no fluffing of the electroconductive fibers occurred.

Further, both the surfaces thereof had a good electrical conductivity (surface resistivity: $10^5$ to $10^6 \Omega$).

EXAMPLE 2

An electroconductive non-woven fabric having a basis weight of 10 g/m² was obtained from 85% by weight of polyvinyl chloride fibers (Teviron, trademark of product made by Teijin Ltd.) having a fiber diameter of 2d and a fiber length of 51 mm) and 15% by weight of austenite stainless steel fibers having a fiber diameter of 8 μm and a fiber length of 50 mm, using an acrylic resin as a binder.

Next, a polyvinyl chloride compound obtained by blending 100 parts by weight of a polyvinyl chloride having an average polymerization degree of 1,300 with 3.0 parts by weight of dioctyl phthalate, 2.5 parts by weight of a dibutyltin alkyl maleate, 0.5 part by weight of butyl stearate, 0.4 part by weight of stearyl alcohol and 0.1 part by weight of stearic acid was melt-kneaded by means of an extruder provided with a screw die having a bore diameter of 65 mm and extruded at a resin temperature of 185° C. in the form of film.

On both the surfaces of the resulting resin film was overlaid the above-mentioned electroconductive non-woven fabric, followed by integrally contact-bonding the resin film as a substrate to the electroconductive non-woven fabric by means of a pair of a touch roll (metal roll) of 200 mm in diameter into which hot water at 70° C. was passed and a chill roll (metal roll) of 400 mm in diameter to obtain an electroconductive polyvinyl chloride sheet of 0.5 mm thickness. In addition, at this step, onto the surface of the electroconductive non-woven fabric on the side of the touch roll was inserted a biaxially stretched polyester film of 12 μm thickness, followed by cooling the resulting electroconductive polyvinyl chloride sheet and peeling off the polyester film. Both the surfaces of the electroconductive polyvinyl chloride sheet at that time had a surface resistivity of $10^3$ to $10^4 \Omega$.

Next, both the surfaces of the above-mentioned polyvinyl chloride sheet were subjected to corona discharge treatment by means of a corona discharge treatment equipment for electroconductors in the atmosphere. Both the surfaces had a wetting tension of 43 dyne/cm. Further, both the surfaces of the electroconductive polyvinyl chloride sheet after corona discharge treatment had a surface resistivity of $10^3$ to $10^4 \Omega$, that is, entirely unchanged from the values before the corona discharge treatment.

Further, as the curing composition, there was prepared a mixed composition consisting of 48% by weight of a polyurethane acrylate oligomer, 45% by weight of neopentyl glycol diacrylate, 6% by weight of an extender pigment (alumina white) and 1% by weight of a polymerization inhibitor.

Figures 3, 4:
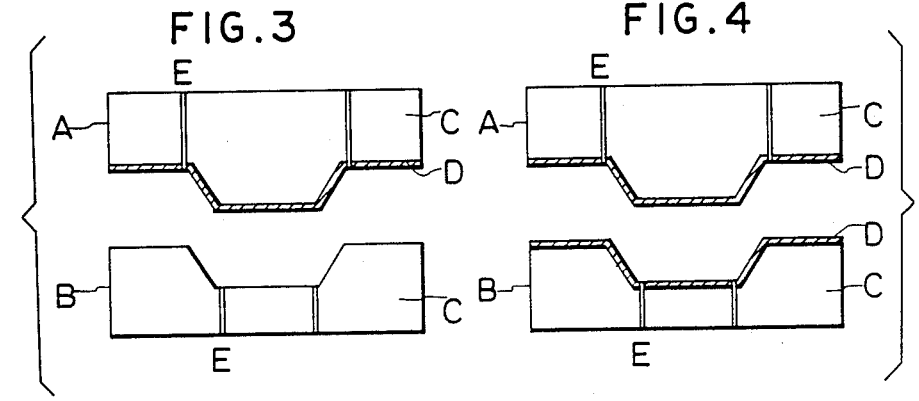
FIG. 3 shows a male mold and female mold consisting of a male mold (A) having a structure wherein a body material thereof (C) is templated and the surface of the resulting material is coated with a heat-resistant rubber and a female mold (B) consisting only of the body material (C).
FIG. 4 shows a pair of male mold and female mold having a structure wherein the surfaces of the body materials (C) of both the molds are coated with a heat-resistant rubber.

The composition was applied to the surface (one side surface) of the electroconductive polyvinyl chloride sheet by means of a gravure roll with a half tone screen ($A_P/A_T=0.8$), followed by irradiating electron beams on the resulting material by means of an electron curtain conveyor type electron beam irradiation equipment (ELECTRON EPZ-2 type, trademark of product manufactured by ESI Co., Ltd.) in $N_2$ atmosphere ($O_2$ concentration: 200 ppm) at an accelerated voltage of 160 KV in an amount of radiation of 12 M rad to form a crosslinked and cured coating of 7 μm thickness. Similarly, a crosslinked and cured coating of 7 μm thickness was also formed on the other surface. Next, an electroconductive polyvinyl chloride sheet having a crosslinked and cured coating formed thereon was inserted and fixed between a pair of male and female molds (body material used: met al and mold temperature: 40° C.), as shown in FIG. 4, and both the molds were fitted to each other under a pressure of 5 kg/cm²G to obtain an electroconductive molded product. At that time, a silicone rubber (thickness, 3 mm, hardness, 40) was used on the respective surfaces of both of the molds. The clearance (CL) between the male mold and the female mold was made 0.2 to 0.4 mm. No fluffing and no Jutting phenomenon of the electroconductive fibers were observed on ether of the surfaces of the resulting electroconductive molded product, and yet even when the surfaces were strongly rubbed by cloth, nails, etc., no fluffing of the fibers occurred.

Further, both of the surfaces had a good electrical conductivity (surface resistivity: $10^4$ to $10^5 \Omega$).

EXAMPLE 3

An electroconductive non-woven fabric having a basis weight of 10 g/m² was prepared according to binder process from 75% by weight of acrylonitrile-vinyl chloride copolymer fibers (Kanekaron SB ® of product made by Kanegafuchi Chemical Industry Co., Ltd.) having a fiber diameter of 1.5 d and a fiber length of 51 mm and 25% by weight of austenite stainless steel fibers (NASLON®, product made by NIPPON SEISEN Co., Ltd.) having a fiber diameter of 8 μm and a fiber length of 50 mm, using an acrylic resin as a binder.

Next, a GP-PS resin (ESTYRENE G-32, trademark of product made by Nippon Steel Chemical Co., Ltd.) was melt-kneaded by means of an extruder having a bore diameter of 40 mm, followed by extruding the resulting material through a T-die of 300 mm width, at a resin temperature of 230° C in the form of film. On one side surface of the resulting resin film was overlaid the above-mentioned electroconductive non-woven fabric, followed by integrally contact-bonding the substrate to the electroconductive non-woven fabric by means of a pair of polishing rolls (metal rolls) in which hot water at 60° C was passed to obtain an electroconductive polystyrene sheet of 0.7 mm thickness. The electroconductive polystyrene sheet had a surface resistivity of $103 \Omega$.

Next, the surface of the electroconductive nonwoven fabric laminated onto the electroconductive polystyrene sheet was subjected to corona discharge treatment. The treated surface had a wetting tension of 39 dyne/cm. Further, the surface of the electroconductive non-woven fabric laminated onto the electroconductive polystyrene sheet after the corona discharge treatment had a surface resistivity of $103 \Omega$, that is, entirely unchanged from that before the corona discharge treatment.

Further, as the curing composition, there was prepared a mixed composition consisting of 48% by weight of a polyurethane acrylate oligomer, 45% by weight of neopentyl glycol diacrylate, 6% by weight of an extender pigment (alumina white) and 1% by weight of a polymerization inhibitor.

The composition was applied to the surface (one side) of the electroconductive polystyrene sheet by means of a gravure roll with a half tone screen ($A_P/A_T=0.8$), followed by irradiating electron beams onto the resulting material by means of an electron curtain conveyor type electron beam irradiation equipment (EPZ-2 type) in $N_2$ atmosphere ($O_2$ concentration: 150 ppm) at an accelerated voltage of 140 KV and in an amount of radiation of 6 M rad to form a crosslinked and cured coating.

Next, the electroconductive polystyrene sheet having a cross-linked and cured coating formed thereon was inserted and fixed between a pair of male and female molds (body material used: metal, and mold temperature: 40° C.) as shown in FIG. 4, followed by fitting both the molds to each other under a pressure of 3 kg/cm²G to obtain an electroconductive molded product. At that time, a fluororubber (thickness: 3 mm and hardness: 60) was used on the respective surfaces of both the molds. The clearance (CL) between the male and female molds was made 0.4 to 0.6 mm.

On both the surfaces of the electroconductive molded product was observed neither fluffing nor jutting phenomenon, and yet even when the surfaces were strongly rubbed by cloth, nails, etc., no fluffing of the electroconductive fibers occurred. Further, the laminated surfaces of the electroconductive non-woven fabric had a good electrical conductivity (surface resistivity: $10^4$ to $10^5 \Omega$).

EXAMPLE 4

As the curing composition,-there was prepared a mixed composition consisting of 64% by weight of a polyester polyacrylate, 30% by weight of a polyol polyacrylate, by weight of trimethylolpropane triacrylate and 1% by weight of benzoyl peroxide.

The mixed composition was applied to one side surface of an electroconductive polypropylene sheet same as that used in Example 1 (subjected to corona discharge treatment) by means of a gravure roll with a half tone screen ($A_P/A_T=0.6$), followed by heat treating the resulting material in an oven at 130° C. for 5 minutes to form a crosslinked and cured coating of 5 μm thickness. Similarly, a crosslinked and cured coating of 5 μm thickness was formed on the other surface.

Next, the above-mentioned electroconductive polypropylene sheet having the crosslinked and cured coating formed thereon was inserted and fixed between a pair of male and female molds (body material used: metal and the mold temperature: 50° C.) as shown in FIG. 1, followed by fitting both the molds to each other under a pressure of 7 kg/cm²G to obtain an electroconductive molded product. At that time, a silicone rubber (hardness: 40) was used on the surface layer of the male mold. The clearance (CL) between the male mold and the female mold was made 0.5–0.7 mm.

No fluffing and no Jutting phenomenon of the electroconductive fibers was observed on either of the surfaces of the resulting electroconductive molded product, and even when the surfaces were strongly rubbed by cloth, nails, etc., no fluffing of electroconductive fibers occurred.

Further, the product had a good electrical conductivity on both the surfaces (surface resistivity: $10^5$ to $10^6 \Omega$).

EXAMPLE 5

As the curing composition, there was prepared a mixed composition consisting of 43% by weight of a polyester polyacrylate, 40% by weight of a polyol polyacrylate, 15% by weight of trimethylolpropane triacrylate and 2% by weight of benzil.

The composition was applied to one surface of the electroconductive polyvinyl chloride sheet the same as that used in Example 2 (subjected to corona discharge treatment) by means of a gravure roll with a half tone screen ($A_P/A_T=0.8$), followed by irradiating ultraviolet rays to the surface to form a crosslinked and cured coating of 7 μm thickness. Similarly, a crosslinked and cured coating of 7 μm thickness was formed on the other surface.

Next, the electroconductive polyvinyl chloride sheet having a crosslinked and cured coating formed thereon was inserted and fixed between a pair of male and female molds (body material used: metal, and mold temperature: 40° C.) as shown in FIG. 4, and both the molds were fitted to each other under a pressure of 5 kg/m$^2$G to obtain an electroconductive molded product. At that time, a silicone rubber (thickness: 3 mm and hardness: 40) was used on the surfaces of both the molds. The clearance (CL) between the male and female molds was made 0.2 to 0.4 mm.

No fluffing and no jutting phenomenon of the electroconductive fibers was observed on either or the surfaces of the resulting electroconductive molded product, and even when the surfaces were rubbed by cloth, nails, etc., no fluffing of electroconductive fibers occurred.

Further, both the surfaces had a good electrical conductivity (surface resistivity: $10^4$ to $10^5 \Omega$).

COMPARATIVE EXAMPLE 1

An electroconductive polpyropylene sheet having a crosslinked and cured coating formed thereon was obtained in the same manner as in Example 1. The sheet was subjected to heat forming by means of a conventional vacuum forming equipment. Jutting phenomenon of the electroconductive fibers was observed in the vicinity of the corners of the resulting electroconductive molded product not contacted with the molds.

COMPARATIVE EXAMPLE 2

An electroconductive polypropylene sheet having a crosslinked and cured coating formed thereon was obtained in the same manner as in Example 1. The sheet was subjected to press forming by means of a pair of male and female molds (clearance (CL) between the male and female molds: 0.6–0.8 mm). The resulting electroconductive molded product had some portions not contacted with the molds, and at the portions, peeling-off of the crosslinked and cured coating was observed and also fluffing of electroconductive fibers was confirmed. Further, even at portions molded in contact with the molds and having no fluffing of electroconductive fibers, when the portions were rubbed by nails, fluffing was observed to occur.

COMPARATIVE EXAMPLE 3

Example 2 was repeated except that the thickness of the crosslinked and curred coating was changed to 15 μm to obtain an electroconductive molded product. On both the surfaces of the molded product was observed neither fluffing nor jutting phenomenon, and even when the surfaces were rubbed by nails, cloth, etc., no fluffing of electroconductive fibers occurred, but the surface resistivity values were $10^{12} \Omega$ or more and the electrical conductivity of the surfaces was far inferior.

COMPARATIVE EXAMPLE 4

An electroconductive polyvinyl chloride sheet (not having a crosslinked and cured coating formed thereon) the same as that used in Example 2 was inserted and fixed between a pair of male and female molds as shown in FIG. 4, followed by fitting both the molds to each other and molding the sheet to obtain an electroconductive molded product. Both surfaces of the molded product had a good electrical conductivity (surface resistivity $10^4$–$10^5 \Omega$), but when the surfaces were rubbed by nails, fluffing of electroconductive fibers occurred.

COMPARATIVE EXAMPLE 5

Onto both the surfaces of an electroconductive polypropylene sheet (subjected to corona discharge treatment), same as that used in Example 1, was applied a curing composition (the same as that used in Example 1) by means of a gravure roll with a half tone screen ($A_P/A_t=0.2$), followed by forming a crosslinked and cured coating of 3 μm thickness under the same curing conditions as in Example 1. The resulting sheet was inserted and fixed between a pair of male and female molds (mold temperature: 50° C.) as shown in FIG. 1, followed by fitting both the molds to each other under a pressure of 7 kg/cm$^2$G to obtain an electroconductive molded product. At that time, a silicone rubber (hardness: 40) was used on the surface of the male mold. The clearance (CL) between the male and female molds was made 0.5–0.7 mm.

Both the surfaces of the resulting electroconductive molded product had a good electrical conductivity (surface resistivity: $10^5$–$10^6 \Omega$), but when the surfaces were rubbed by nails, fluffing of electroconductive fibers was observed at portions where no crosslinked and cured coating was formed.

COMPARATIVE EXAMPLE 6

On both the surfaces of an electroconductive polypropylene sheet (subjected to corona discharge treatment), the same as used in Example 1, was applied a curing composition (the same as that used in Example 1, by means of a gravure roll in solid printing ($A_P/A_T=1.0$), followed by forming a corosslinked and cured coating of 3 μm thickness under the same conditions as in Example 1. The resulting sheet was inserted and fixed between a pair of male and female molds (mold temperature: 50° C.) as shown in FIG. 1, followed by fitting both the molds to each other under a pressure of 7 kg/cm$^2$G to obtain an electroconductive molded product. At that time, a silicone rubber (hardness: 40) was used on the surface layer of the male mold. The clearance (CL) between the male and female molds was made 0.5–0.7 mm.

Both the surfaces of the resulting electroconductive molded product had a good electrical conductivity (surface restivity value: $10^5$–$10^6 \Omega$), but the coating cracked due to deformation at the time of heat forming to notably damage the appearance; hence such a moled product was difficult for practical use.

EXAMPLE 6

Spun yarns (30 d) prepared from a fiber mixture consisting of 15% by weight of cut stainless steel fibers (fiber diameter: 12 μm) and 85% by weight of cut polypropylene fibers (fiber diameter: 2 d) were woven to obtain an electroconductive woven fabric (60 warp yarns/in and 52 weft yarns/in).

Next, polypropylene pellets obtained by blending a highly crystalline propylene homopolymer (isotactic pentad ratio (P): 0.968, melt flow rate (MFR): 0.53 g/10 min and high melt flow rate (HMFR): 23.5 g/10 min) with 1,3,5-trimethyl-2,4,6-tris(3,5-di-t-butyl-4-hydroxybenzyl)benzene (0.10% by weight), tetrakis[methylene(3,5-di-t-butyl-4-hydroxy-hydrocinnamate)]methane (0.10% by weight) and calcium stearate (0.05% by weight) were melt-kneaded by an extruder having a bore diameter of 65 mm and extruded through a T-die of 600 mm width at a resin temperature of 240° C. in the form of film.

On both the surfaces of the resulting resin film was overlaid the above-mentioned electroconductive woven fabric, followed by contact-bonding the substrate to the electroconductive woven fabric by means of a pair of a touch roll (metal roll) of 200 mm in diameter in which hot water at 80° C. was passed and a chill roll (metal roll) cf 500 mm in diameter to obtain an electroconductive polypropylene sheet of 0.8 mm thickness. The sheet was then passed between heated rolls heated to 160° C. As a result, the polypropylene fibers of the electroconductive woven fabric melted completely and the fabric was integrated with the polypropylene sheet as the substrate to obtain an electroconductive polypropylene sheet having stainless steel fibers alone reticularly fixed onto the surface thereof.

The surface resistivities of the electroconductive polypropylene sheet on both the surfaces thereof at that time were $10^4\Omega$.

Next, both the surfaces of the electroconductive polypropylene sheet were subjected to corona discharge treatment by means of a corona discharge treatment equipment for electroconductors in the atmosphere. Both the surfaces had a wetting tension of 41 dyne/cm. Further, the surface resistivities of the electroconductive polypropylene sheet after the discharge treatment on both the surfaces thereof were $10^4\Omega$, that is, entirely unchanged from those before the corona discharge treatment.

Further, as the curing composition, there was prepared a mixed composition consisting of a polyepoxy acrylate oligomer (42% by weight), 2-hydroxypropyl acrylate (55% by weight), a betaine surfactant (2% by weight) and a polymerization inhibitor (1% by weight).

The composition was applied onto the whole surface (one side surface) of the above electroconductive polypropylene sheet by means of a gravure roll ($A_P/A_T=0.6$), followed by irradiating electron beams by means of an electron curtain conveyor type electron beam irradiation equipment (ELECTRON EPZ-2 type) in $N_2$ atmosphere ($O_2$ concentration: 200 ppm) at an accelerated voltage of 140 KV and in an amount of radiation of 6 M rad to form a crosslinked and cured coating of 5 $\mu$m thickness.

Similarly, a crosslinked and cured coating of 5 $\mu$m thickness was formed on the other surface.

Next, the electroconductive polypropylene sheet having the crosslinked and cured coating formed thereon was inserted and fixed between a pair of male and female molds (body material used: metal and mold temperature: 50° C.) as shown in FIG. 1, followed by fitting both the molds to each other under a pressure of 7 kg/cm² to obtain an electroconductive molded product. At that time, a silicone rubber (hardness=40) was used on the surface layer of the male mold. Further, the clearance (CL) between the male and female molds was made 0.5-0.7 mm. No fluffing of electroconductive fibers was observed on both the surfaces, and even when the surfaces were strongly rubbed by cloth, nails, etc., no fluffing of electroconductive fibers occurred.

Further, both the surfaces had a good electrical conductivity (surface restivities: $10^4$-$10^5\Omega$)

EXAMPLE 7

Spun yarns (15 d) prepared from a fiber mixture consisting of 20% by weight of cut carbon-coated polyester fibers (fiber diameter: 3 d) and 80% by weight of cut polyvinyl chloride fibers (Teviron) were woven to obtain an electroconductive woven-fabric (115 warp yarns/in and 114 weft yarns/in).

Next, a polyvinyl chloride compound consisting of a polyvinyl chloride having an average polymerization degree of 1,300 (100 parts by weight), dioctyl phthalate (3.0 parts by weight), a dibutyltin alkyl maleate (2.5 parts by weight), butyl stearate (0.5 part by weight), stearyl alcohol (0.4 part by weight) and stearic acid (0.1 part by weight) was melt-kneaded by means of an extruder having a bore diameter of 65 mm and extruded through a T-die of 500 mm width at a resin temperature of 185° C. in the form of film.

On both the surfaces of the resulting resin film was overlaid the above-mentioned electroconductive woven fabric, followed by contact-bonding the substrate to the electroconductive woven fabric by means of a touch roll (metal roll) of 200 mm in diameter in which hot water at 70° C was passed and a chill roll (metal roll) to obtain an electroconductive polyvinyl chloride sheet of 0.7 mm thick. The sheet was then passed between heated rolls heated to 170° C. As a result, the polyvinyl chloride fibers in the electroconductive woven-fabric melted completely and was integrated with the polyvinyl chloride sheet as a substrate to have carbon-coated polyester fibers alone adhered tightly onto the surface thereof in a reticular form. Both the surfaces of the electroconductive polyvinyl chloride sheet at that time had a surface resistivity of $10^5$-$10^6\Omega$.

Next, both the surfaces of the electroconductive polyvinyl chloride sheet were subjected to corona discharge treatment by means of a corona discharge treatment equipment for electroconductors in the atmosphere. Both the surfaces had a wetting tension of 45 dyne/cm. Further, the surface resistivities of the electroconductive polyvinyl chloride sheet after the corona discharge treatment on both the surfaces thereof were $10^5$-$10^6\Omega$, that is, entirely unchanged from those before the corona discharge treatment.

Further, as the curing composition, there was prepared a mixed composition consisting of a polyurethane acrylate oligomer (48% by weight), neopentyl glycol diacrylate (45% by weight), an extender pigment (alumina white) (6% by weight) and a polymerization inhibitor (1% by weight).

This composition was applied onto the surface (one side surface) of the above electroconductive polyvinyl chloride sheet by means of a gravure roll with a half tone screen ($A_P/A_T=0.8$)/followed by irradiating electron beams by means of an electron curtain conveyor type electron beam irradiation equipment (EPZ-2 type) in $N_2$ atmosphere ($O_2$ concentration: 200 ppm) at an accelerated voltage of 160 KV and in an amount of radiation of 12 M rad to form a crosslinked and cured coating of 7 $\mu$m thickness. Similarly, a crosslinked and cured coating of 7 μm thickness was formed on the other surface.

Next, the electroconductive polyvinyl chloride sheet having the crosslinked and cured coating formed thereon was inserted and fixed between a pair of male and female molds (body material used: metal and mold temperature: 40° C.) as shown in FIG. 4, followed by fitting both the molds to each other under a pressure of 5 kg/cm²G to obtain an electroconductive molded product. At that time, a silicone rubber (thickness: 3 mm, hardness: 40) was used on the surface layers of both the molds. Further, the clearance (CL), between the male and female molds was made 0.2–0.4 mm.

No fluffing of the electroconductive fibers was observed on either of the surfaces, and even when the surfaces were strongly rubbed, no fluffing of electroconductive fibers occurred.

Further, both the surfaces has a good electrical conductivity (surface resistivity: $10^6$–$10^7 \Omega$).

EXAMPLE 8

Spun yarns (15 d) prepared from a fiber mixture consisting of 90% by weight of cut acrylonitrile-vinyl chloride copolymer fibers (Kanekaron SB) (fiber diameter: 1.5 d) and 10% by weight of cut austenite steel fibers (Naslon) (fiber diameter: 8 μm) were knitted to obtain an electroconductive knitted fabric having a basis weight of 80 g/m². Next, a polystyrene resin (ESTYRENE G32) was melt-kneaded by means of an extruder having a bore diameter of 40 mm and extruded through a T-die of 300 mm width at a resin temperature of 230° C. in the form of film. On one surface of the resulting film was overlaid the above-mentioned electroconductive knitted fabric, followed by contact-bonding the substrate to the electroconductive knitted fabric by means of a pair of polishing rolls (metal rolls) in which hot water at 60° C. was passed, to obtain an electroconductive polystyrene sheet of 0.7 mm thickness.

The sheet was then passed through between heated rolls heated to 180° C. As a result, the acrylonitrilevinyl chloride copolymer fibers in the electroconductive knitted fabric melted completely and were integrated with the polystyrene sheet as the substrate to have the stainless steel fibers alone adhered tightly onto the surface. The surface resistivity of the surface of the electroconductive knitted fabric laminated onto the sheet was $10^5 \Omega$.

Next, the surface of the electroconductive knitted fabric laminated onto the electroconductive polystyrene sheet was subjected to corona discharge treatment by means of a corona discharge treatment equipment for electroconductors. The wetting tension of the treated surface was 39 dyne/cm. Further, the surface resistivities of the electroconductive knitted fabric laminated onto the electroconductive polystyrene sheet were $10^5 \Omega$, that is, entirely unchanged from those before the corona discharge treatment. Further, as the curing composition, there was prepared a mixed composition consisting of a polyurethane acrylate oligomer (48% by weight), neopentyl glycol diacrylate (45% by weight), an extender pigment (alumina white) (6% by weight) and a polymerization inhibitor (1% by weight).

The composition was applied to the whole surface of the electroconductive knitted fabric laminated to the electroconductive polystyrene sheet by means of a gravule roll with a half tone screen ($A_P/A_t$=0.8), followed by irradiating electron beams by means of an electron curtain conveyor type electron beam irradiation equipment (ELECTRON EPZ-2 type) in $N_2$ atmosphere ($O_2$ concentration: 150 ppm) at an accelerated voltage of 160 KV and in an amount of radiation of 12Mrad to form a crosslinked and cured coating of 10 μm thickness.

Next, the electroconductive polystyrene sheet having the crosslinked and cured coating formed thereon was inserted and fixed between a pair of male and female molds (body material used' metal and mold temperature: 40° C.) as shown in FIG. 4, followed by fitting both the molds to each other under a pressure of 3 kg/cm²G to obtain an electroconductive molded product. At that time, a fluororubber (thickness: 3 mm and hardness' 60) was used on the surface layers of both the molds. Further, the clearance (CL) between the male and female molds was made 0.4–0.6 mm.

No fluffing of electroconductive fibers was observed on either of the surfaces of the resulting electroconductive molded product, and even when the surfaces were strongly rubbed, no fluffing of electroconductive fibers occurred. Further, the surface of the electroconductive knitted fabric laminated onto the sheet had a good electrical conductivity (surface resistivity: $10^6$–$10^7 \Omega$).

EXAMPLE 9

As the curing composition, there was prepared a mixed composition consisting of 64% by weight of a polyester polyacrylate, 30% by weight of a polyol polyacrylate, 5% by weight of trimethylolpropane triacrylate and 1% by weight of benzoyl peroxide.

The mixed composition was applied onto one side surface of an electroconductive polypropylene sheet same as that used in Example 6 (subjected to corona discharge treatment) by means of a gravure roll with a half tone screen ($A_p/A_7$=0.6), followed by heat treating the resulting material for 5 minutes to form a crosslinked and cured coating of 5 μm thickness. Similarly, a crosslinked and cured coating of 5 μm thickness was formed on the other surface.

Next, the electroconductive polypropylene sheet havig the crosslinked and cured coating formed thereon was inserted and fixed between a pair of male and female molds (body material used' metal and mold temperature' 50° C.), followed by fitting both the molds to each other under a pressure of 7 kg/cm²G to obtain an electroconductive molded product. At that time, a silicone rubber (hardness: 40) was used on the surface layer of the male mold. Further, the clearance (CL) between the male and female molds was made 0.5–0.7 mm.

No fluffing of electroconductive fibers was observed on the surface of the electroconductive molded product, and even when the surface was strongly rubbed by means of cloth, nails, etc., no fluffing of electroconductive fibers occurred. Further, the surface had a good electrical conductivity (surface resistivity: $10^4$ to $10^5 \Omega$).

EXAMPLE 10

As the curing composition, there was prepared a mixed composition consisting of 43% by weight of a polyester polyacrylate, 40% by weight of a polyol polyacrylate, 15% by weight of trimethylolpropane triacrylate and 2% by weight of benzil.

The composition was applied onto one side surface of the electroconductive polyvinyl chloride sheet same as that used in Example 7 (subjected to corona discharge treatment) by means of a gravure roll with a half tone screen ($A_P/A_T$=0.8), followed by irradiating ultraviolet rays onto the surface to form a crosslinked and cured coating of 7 μm thickness. Similarly, a crosslinked and cured coating of 7 μm thickness was formed on the other surface.

Next, the electroconductive polyvinyl chloride sheet having the crosslinked and cured coating formed thereon was inserted and fixed between a pair of male and female molds (body material used: metal and mold temperature: 40° C.) as shown in FIG. 4, followed by fitting both the molds to each other under a pressure of 5 kg/cm$^2$G to obtain an electroconductive molded product. At that time, a silicone rubber (thickness' 3 mm and hardness: 40) was used on the surfaces of both the molds. Further, the clearance (CL) between the male and female molds was made 0.2–0.4 mm.

No fluffing of electroconductive fibers was observed on both the surfaces, and even when the surfaces were rubbed by cloth, nails, etc., no fluffing of electroconductive fibers occurred.

Further, both the surfaces had a good electrical conductivity (surface resistivity: $10^6$–$10^7\Omega$).

COMPARATIVE EXAMPLE 7

An electroconductive polypropylene sheet having a crosslinked and cured coating formed thereon was obtained in the same manner as in Example 6. The sheet was subjected to heat forming by means of a conventional vacuum forming equipment. Jutting phenomenon was observed in the vicinity of the corners of the resulting electroconductive mold product not contacted with the molds.

COMPARATIVE EXAMPLE 8

An electroconductive polypropylene sheet having a crosslinked and cured coating formed thereon was obtained in the same manner as in Example 6. The sheet was subjected to press forming by means of a pair of male and female molds (clearance (CL) between the male and female molds: 0.6–0.8 mm). The resulting electroconductive molded product had some portions not contacted with the molds, and at the portions, peeling-off of the crosslinked and cured coating was observed and also fluffing of electroconductive fibers was confirmed. Further, even at portions molded in contact with the molds and having no fluffing of electroconductive fibers, when the portions were rubbed by nails, fluffing was observed to occur.

COMPARATIVE EXAMPLE 9

Example 7 was repeated except that the thickness of the crosslinked and curred coating was changed to 20 μm to obtain an electroconductive molded product. On both the surfaces of the molded product was observed neither fluffing nor jutting phenomenon, and even when the surfaces were rubbed by nails, cloth, etc., no fluffing of electroconductive fibers occurred, but the surface resistivity values were $10^{12}\Omega$ or more and the electrical conductivity of the surfaces was far inferior.

COMPARATIVE EXAMPLE 10

An electroconductive polyvinyl chloride sheet (not having a crosslinked and cured coating formed thereon) same as that used in Example 7 was inserted and fixed between a pair of male and female molds as shown in FIG. 4, followed by fitting both the molds to each other and molding the sheet to obtain an electroconductive molded product. Both the surfaces of the molded product had a good electrical conductivity (surface resistivity $10^6$–$10^7\Omega$), but when the surfaces were rubbed by nails, fluffing of electroconductive fibers occurred.

COMPARATIVE EXAMPLE 11

Onto both the surfaces of an electroconductive polypropylene sheet (subjected to corona discharge treatment) same as that used in Example 6 was applied a curing composition same as that used in Example 6 by means of a gravure roll with a half tone screen ($A_P/A_t=0.2$), followed by forming a crosslinked and cured coating of 3 μm thickness under the same curing conditions as in Example 6. The resulting sheet was inserted and fixed between a pair of male and female molds (mold temperature' 50° C.) as shown in FIG. 1, followed by fitting both the molds to each other under a pressure of 7 kg/cm$^2$G to obtain an electroconductive molded product. At that time, a silicone rubber (hardness: 40) was used on the surface of the male mold. The clearance (CL) between the male and female molds was made 0.5–0.7 mm.

Both the surfaces of the resulting electroconductive molded product had a good electrical conductivity (surface resistivity: $10^4$–$10^5\Omega$), but when the surfaces were rubbed by nails, fluffing of electroconductive fibers was observed at portions where no crosslinked and cured coating was formed.

COMPARATIVE EXAMPLE 12

On both the surfaces of an electroconductive polypropylene sheet (subjected to corona discharge treatment) the same as used in Example 6, was applied a curing composition, same as that used in Example 6 by means of a gravure roll in solid printing ($A_P/A_t=1.0$), followed by forming a crosslinked and cured coating of 3 μm thickness under the same conditions as in Example 6. The resulting sheet was inserted and fixed between a pair of male and female molds (mold temperature: 50° C.) as shown in FIG. 1, followed by fitting both the molds to each other under a pressure of 7 kg/cm$^2$G to obtain an electroconductive molded product. At that time, a silicone rubber (hardness: 40) was used on the surface layer of the male mold. The clearance (CL) between the male and female molds was made 0.5–0.7 mm.

Both the surfaces of the resulting electroconductive molded product had a good electrical conductivity (surface restivity value: $10^4$–$10^5\Omega$), but the coating cracked due to deformation at the time of heat forming to notably damage the appearance; hence such a moled product was difficult for practical use.

The molded product of the present invention is an electroconductive molded product obtained by forming a crosslinked and cured coating of 1 to 15 μm adhered to an electroconductive thermoplastic resin sheet as a substrate comprising electroconductive fibers, followed by subjecting the sheet to heat forming by means of molds of the present invention, to thereby completely inhibit fluffing of electroconductive fibers therein and occurrence of jutting of the product, while retaining good electroconductive properties, and further have no deterioration of the appearance due to fluffing of electroconductive fibers, no contamination of environment due to falling-off of electroconductive fibers and no deterioration of electrical conductivity, these problems having so far been raised. In particular, since occurrence of fluffing of electroconductive fibers due to rubbing of the contents of the product has been completely inhibited, the molded product of the present invention has become usable for containers for transporting and storing semiconductors of IC, LSI, etc., electronic parts, precision machine parts, etc., various parts for clean room, various containers, etc.

What we claim is:

1. An electroconductive thermoplastic resin molded product comprising
    (a) an electroconductive thermoplastic resin sheet including a thermoplastic resin film;
    (b) a non-woven fabric consisting of hot-melt-adhesive fibers and electroconductive fibers irregularly entangled with each other and applied and integrally melt-adhered to one or both surfaces of said film and then subjected to surface treatment; and
    (c) a coating having a curing composition composed mainly of an unsaturated resin and a reactive diluent applied to the treated surface and crosslinked and cured and having a coating thickness of 1 to 10 μm,
    said electroconductive thermoplastic resin sheet being fixed between a pair of male and female molds at least one surface of which has a heat-resistant rubber thereat and molded between the molds to each other.

2. An electroconductive thermoplastic resin molded product according to claim 1 wherein said surface treatment is a corona discharge treatment.

3. An electroconductive thermoplastic resin molded product according to claim 1 wherein said curing of said curing composition is carried out by means of electron beams.

4. An electroconductive thermoplastic resin molded product according to claim 1 wherein said electroconductive fibers are carbon fibers, stainless steel fibers, carbon composite synthetic fibers, carbon-coated synthetic fibers or mixtures of at least two members of the foregoing.

5. An electroconductive thermoplastic resin molded product according to claim 1 wherein said heat-resistant rubber is silicone rubber, acrylic rubber or fluorinated rubber.

6. An electroconductive thermoplastic resin molded product according to claim 1 wherein said curing composition is partly applied to the surface of said electroconductive resin sheet by means of a half tone screen and the applied area ($A_P$) and the area of said electroconductive thermoplastic resin sheet ($A_T$) have a relationship of $0.3 \leq (A_P/A_T) \leq 0.9$.

7. An electroconductive thermoplastic resin molded product comprising
    (a) an electroconductive thermoplastic resin sheet including a thermoplastic resin film;
    (b) a knitted or woven fabric consisting of hot-melt-adhesive fibers and electroconductive fibers irregularly entangled with each other and applied and integrally melt-adhered to one or both surfaces of said film and then subjected to surface treatment; and
    (c) a coating having a curing composition composed mainly of an unsaturated resin and a reactive diluent applied to the treated surface and crosslinked and cured and having a coating thickness of 1 to 15 μm,
    said electroconductive thermoplastic resin sheet being fixed between a pair of male and female molds at least one surface of which has a heat-resistant rubber thereat and molded between the molds fitted to each other.

8. An electroconductive thermoplastic resin molded product according to claim 7 wherein said surface treatment is a corona discharge treatment.

9. An electroconductive thermoplastic resin molded product according to claim 7 wherein said curing of said curing composition is carried out by means of electron beams.

10. An electroconductive thermoplastic resin molded product according to claim 7 wherein said electroconductive fibers are carbon fibers, stainless steel fibers, carbon composite synthetic fibers, carbon-coated synthetic fibers or mixtures of at least two members of the foregoing.

11. An electroconductive thermoplastic resin molded product according to claim 7 wherein said heat-resistant rubber is silicone rubber, acrylic rubber or fluorinated rubber.

12. An electroconductive thermoplastic resin molded product according to claim 7 wherein said curing composition is partly applied to the surface of said electroconductive resin sheet by means of a half tone screen, and the applied area ($A_P$) and the area ($A_T$) of said electroconductive thermoplastic resin sheet have a relationship of $0.3 \leq (A_P/A_T) \leq 0.9$.

* * * * *

UNITED STATES PATENT AND TRADEMARK OFFICE
CERTIFICATE OF CORRECTION

PATENT NO. : 4,929,496

DATED : May 29, 1990

INVENTOR(S) : Daimon et al.

It is certified that error appears in the above-identified patent and that said Letters Patent is hereby corrected as shown below:

COLUMN 23, LINE 24
Claim 1, line 19, after "molds" insert --fitted--.
COLUMN 24, LINE 46
Claim 12, line 7, change "09" to --0.9--.

Signed and Sealed this

Seventh Day of April, 1992

Attest:

HARRY F. MANBECK, JR.

Attesting Officer

Commissioner of Patents and Trademarks